United States Patent [19]
Gravatt, Jr.

[11] 3,901,602
[45] Aug. 26, 1975

[54] LIGHT SCATTERING METHOD AND APPARATUS FOR THE CHEMICAL CHARACTERIZATION OF PARTICULATE MATTER

[75] Inventor: Claude C. Gravatt, Jr., Rockville, Md.

[73] Assignee: The United States of America as represented by the Secretary of Commerce, Washington, D.C.

[22] Filed: May 13, 1974

[21] Appl. No.: 469,728

[52] U.S. Cl. ............. 356/114; 250/574; 340/237 S; 356/103; 356/207
[51] Int. Cl.[2] ..................... G01J 4/04; G01N 21/12
[58] Field of Search ........... 356/114, 102, 103, 104, 356/207, 201; 340/237 R, 237 S; 250/574, 575

[56] References Cited
UNITED STATES PATENTS

| | | | |
|---|---|---|---|
| 3,646,352 | 2/1972 | Bol et al. | 356/102 |
| 3,807,862 | 4/1974 | Hatzenbuhler | 356/114 |

Primary Examiner—Ronald L. Wibert
Assistant Examiner—Richard A. Rosenberger
Attorney, Agent, or Firm—David Robbins; Alvin Englert

[57] ABSTRACT

A light scattering method and apparatus for chemically identifying individual particles of matter or multiple particles of matter, such as are found in aerosols, without collecting and chemically analyzing the material. In the case of single particle analysis, plane-polarized light is impinged on the particle and the intensity of the light scattered into the plane of polarization over a specified angular range is measured. The intensity is related to the particle's coefficient of absorption and its size. In multiple particle analysis, the intensity of the light scattered into a plane perpendicular to the plane of polarization is also measured to determine the total number of particles of matter. This information may be used to normalize the intensity measurement of the first scattered light beam. A smoke detector is presented as an apparatus embodying the multiple particle analysis technique whereby fire-produced aerosols may be detected without interference from non-fire-produced aerosols of similar density.

10 Claims, 5 Drawing Figures

LIGHT SCATTERING METHOD AND APPARATUS FOR THE CHEMICAL CHARACTERIZATION OF PARTICULATE MATTER

BACKGROUND OF THE INVENTION

This invention is related to light scattering techniques, and more particularly to a method and apparatus for detecting the intensity of light scattered from a sample of particulate matter whereby the matter may be characterized as to its chemical composition.

In many practical situations, a certain degree of chemical characterization of particulate matter would be highly advantageous. Such situations include those instances in which a particulate atmosphere is monitored by various apparatus to provide an indication of the chemical content thereof, such as occurs in air pollution monitoring studies. Prior art techniques for accomplishing the foregoing disadvantageously require the collection and subsequent chemical analysis of a sample of the particulate matter in a device such as an atomic absorption or emission spectrometer.

There are a number of techniques and devices which may be utilized at the origin of the particulate matter to monitor certain information relating to the matter. For example, one such device in common use in fire alarm systems is a smoke detector which detects the presence of smoke by monitoring a signal related to the total particle density. The foregoing technique has the disadvantage that certain non-fire-produced aerosols have a total particle density high enough to cause a false alarm. Examples are industrial dusts and fumes, cigarette smoke, and "hair spray" aerosols. It would therefore be advantageous to provide a smoke detector which distinguishes between fire-produced and non-fire-produced aerosols.

There exist other instances in which it is of interest to also measure the fraction and size distributions of, for example, carbon-containing or metallic particles, such as in coal mine and industrial plant monitoring.

SUMMARY OF THE INVENTION

A primary object of the present invention is to provide a method and apparatus for chemically characterizing particulate matter at its source without collecting and chemically analyzing it.

Another object of the present invention is to provide a new and unique method for characterizing a single particle of matter as to its chemical composition by utilizing light scattering techniques.

A further object of the present invention is to provide a new and improved light scattering method for chemically characterizing multiple particles of matter.

An additional object of the present invention is to provide a smoke detection method and apparatus that responds to fire-produced particles but not to non-fire-produced particles.

A still further object of the present invention is to provide a method and apparatus for analyzing particulate matter which yields an accurate and reliable indication of the fractions of the various elements present in the matter and which can be utilized at its source.

Another object of the present invention is to provide a light scattering method for the chemical characterization of particulate matter which may be utilized to analyze single or multiple particles of matter.

A still additional object of the present invention is to provide a new and unique scattering method for the characterization of particulate matter as to its chemical composition in which carbon- or metal-containing particles may be distinguished from other materials, and further in which various types of carbon- and metal-containing particles may be distinguished from one another.

The foregoing and other objects are attained in accordance with one aspect of the present invention by projecting plane-polarized light onto a single particle of matter desired to be chemically characterized. The intensity of the light scattered into the plane of polarization within an angular range from about 30° to about 90° with respect to the forward direction of the projected light is measured and found to be related to the coefficient of absorption of the particle whereby its chemical composition may be determined. The intensity is preferably measured over the angular range from about 40° to about 70°.

In accordance with a second aspect of the present invention, multiple particles of matter are identified by further measuring the intensity of the light scattered into a plane normal to the plane of polarization of the incident light beam. This intensity is proportional to the total number of particles and, when compared with the first intensity, provides a normalizing factor.

The foregoing multiple-particle technique is embodied in a smoke detector apparatus which readily distinguishes between carbon-containing and non-carbon-containing aerosols. The photodetectors which measure the intensities of the first and second scattered light beams are connected to any electronic device capable of detecting slopes, such as a ratio detector, an X-Y oscilloscope, X-Y recorder, etc. The slope of the recording is relatively small for carbon-containing aerosols and relatively large for non-carbon-containing aerosols. Fire-produced smoke is thus readily distinguished from other aerosols of similar density.

DETAILED DESCRIPTION OF THE PREFERRED EMBODIMENTS

The total index of refraction, $m$, of any substance can be represented as a complex quantity $$m = n - ik$$

where $n$, the coefficient of refraction, is the real component and $k$, the coefficient of absorption, is the imaginary component. For common optical materials, the absorption coefficient $k$ is small and may be neglected without serious error. The refractive index of silica, for instance, is $1.55 - 0.0i$ or simply 1.55. It is for this reason that the coefficient of refraction $n$ is commonly taken as the total index of refraction ($m$).

The absorption coefficients of the metals, on the other hand, range from about 0.5 to 4 or larger and thus cannot be neglected. Also absorbing are carbon (including soot, coal, graphite) and many organic dyes, which have absorptivities of about 0.1 to 0.7. These characteristic absorptivities are used, in accordance with this invention, to identify the chemical composition of liquid or solid particles suspended in a fluid medium.

Figure 1:
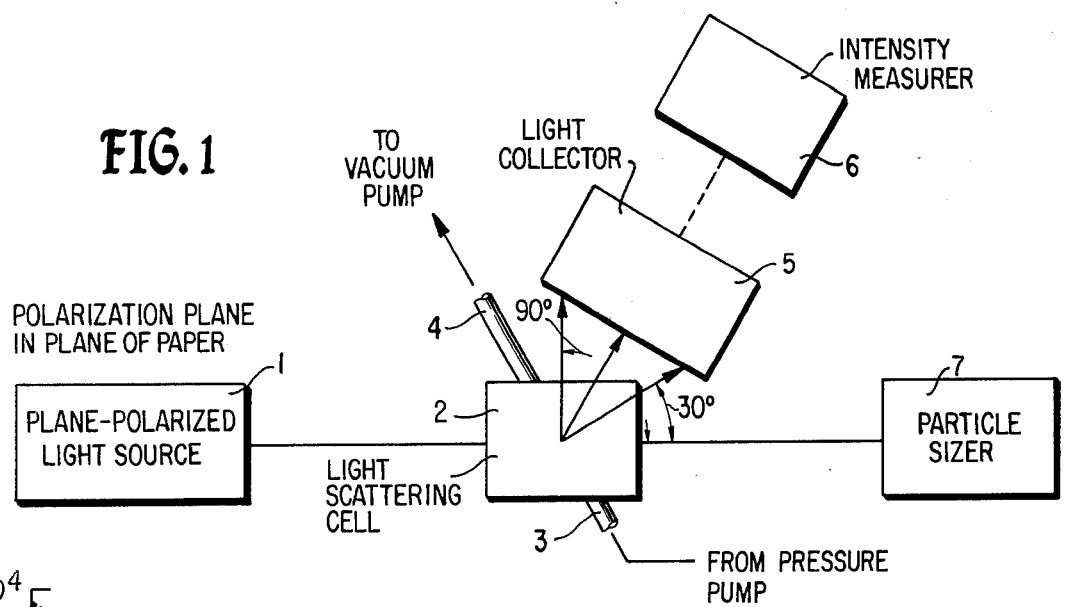
FIG. 1 is a schematic diagram of the present invention.

FIG. 1 shows a light source 1 projecting a collimated beam of plane-polarized light through a light-scattering cell 2. A stream of widely spaced individual particles of unknown composition is flowed through the cell across the incident light beam by means of either a pressure pump connected to an inlet tube 3 or a vacuum pump connected to an outlet tube 4. Each particle scatters the impinging light in all directions; in accordance with this invention, however, only the rays scattered into the plane of polarization (the plane of the paper, FIG. 1) and within an angular range from about 30° to 90° with respect to the forward direction of the projected beam are collected by means of any suitable aperture 5. The aperture 5 preferably is slit-like to avoid collecting rays which deviate more than about 5° to 10° from the plane of polarization. The intensity of the collected rays is measured by any suitable photodetecting system 6. The intensity is high if the particle is an optically nonabsorbing substance like water vapor, earth dust, or aerosol propellant (typically Freon); it is moderate if the particle is metallic; and it is low if the particle is carbon or contains an organic dye. The intensity also varies with the size of the scattering particle and so a particle sizer 7 is provided to measure the particle size. A preferred sizer is disclosed in my copending application Ser. No. 312,529 filed Dec. 6, 1972, for a "System for Determining Parameters of a Particle by Radiant Energy Scattering Techniques" and assigned to the assignee of this application now U.S. Pat. No. 3,612,689. If desired, the output signal from the sizer 7 could be used to normalize (not shown) the output of the intensity measurer 6.

Figure 2:
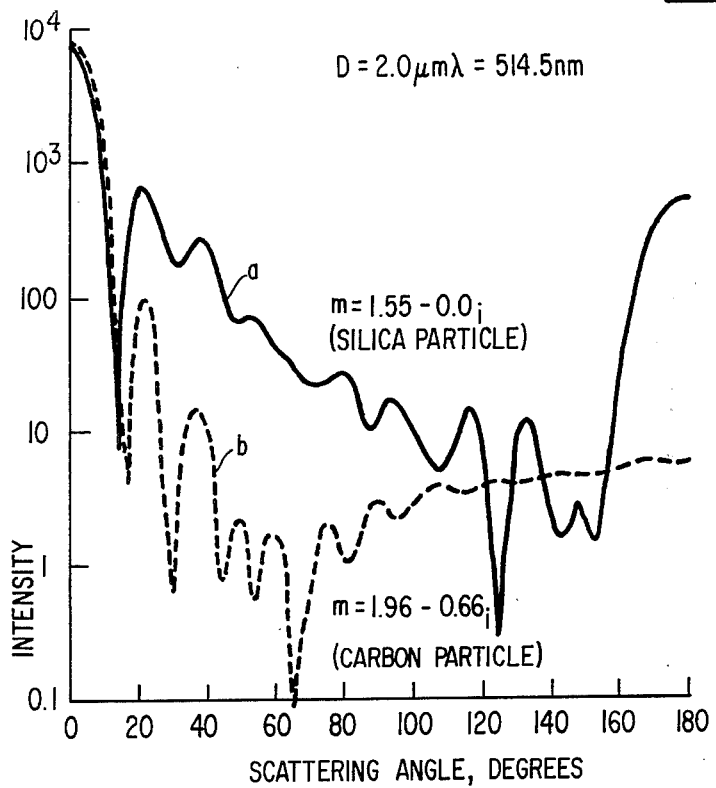
FIG. 2 is a graph of the intensities of the rays scattered by a silica particle and by a carbon particle into the plane of polarization of the impinging light as a function of the scattering angle.

FIG. 2 illustrates the scattering behavior upon which the present invention is based. Light at 514.5 nm (5145 A) is incident in turn upon 2 $\mu$m diameter spherical particles of silica and carbon, whose coefficients of absorptions are 0.0 and 0.66, respectively. The incident light is plane-polarized and the intensity of the rays scattered from the particles into the plane of polarization is measured for all angles from the forward direction (0°) to the backward direction (180°). Curves $a$ and $b$ show that the intensities for the silica and carbon particles, respectively, differ markedly over the angular region from about 30° to 90°. Outside this region, the two curves approach and/or cross each other. The behavior illustrated in FIG. 2 is typical of a wide variety of slightly, moderately, and highly optically absorbing substances in particle sizes from about 0.3 to 10 $\mu$m. Below 0.3 $\mu$m the light scattering is no longer a useful function of the absorption coefficient $k$.

Although the angular range of 30° to 90° is satisfactory for identifying the chemical nature of many kinds of particles, the preferred range of this invention is from about 40° to 70° because it will best distinguish among the various kinds of substances.

The detected scattered rays should lie in or near the plane of polarization of the impinging light, as the difference in intensities for variously absorbing materials appears to be greatest at that orientation. The differences in the plane orthogonal, for example, to the plane of polarization are generally much smaller and apparently cannot be used to identify the substances.

Figure 3:
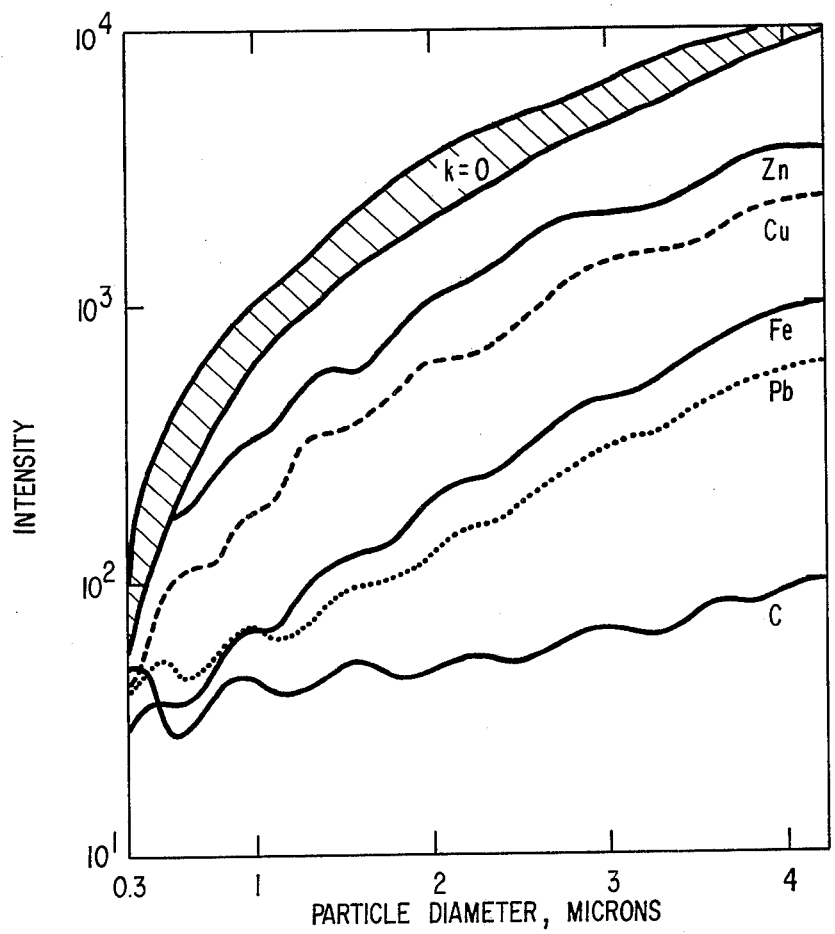
FIG. 3 is a graph of the detected intensities of scattered light for various substances over a particlar angular aperture as a function of the particle diameter of the substance.

FIG. 3 shows the effect of particle diameter on the intensity of the light scattered into a region lying in the plane of polarization and within the preferred angular range from 40° to 70° with respect to the forward direction of the impinging light. The curves depict the intensities obtained with variously sized particles of carbon, which is moderately absorbing; with particles of lead, iron, copper and zinc, which are more highly absorbing; and with particles of a number of materials (the shaded band) which have a wide range of $n$ values but negligibly small $k$ or absorptive coefficient values. FIG. 3 thus illustrates how the outputs from the intensity measurer 6 and particle sizer 7 of FIG. 1 can be used to determine if a particle is carbon, one of the four metals listed, or a nonabsorptive material.

Figure 4:
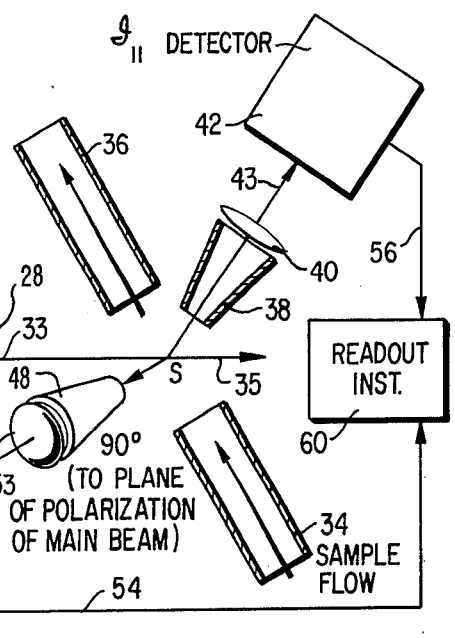
FIG. 4 is a schematic view partly in perspective of a preferred embodiment of a light scattering apparatus for the chemical characterization of multiple particles of matter according to the present invention.

FIG. 4 shows a smoke detector which distinguishes fire-produced carbon-containing smoke from equally dense non-fire-produced aerosols. The instrument includes a light source 22 which may be a polychromatic incandescent bulb or any monochromatic source, for example a medium-pressure mercury arc. Some of the emitted light 23 passes through a condensing lens 24, collimating lens 26, diaphragms 32, and polarizer 28 and emerges as a collimated, linearly polarized beam 33 of uniform intensity approximately 1 cm² in cross section. The plane of polarization again is in the plane of the paper.

The entire system may be located in the actual environment of particulate matter desired to be investigated. Samples of the particulate matter to be investigated are introduced through an inlet tube 34 into the scattering region S and then discharged through outlet tube 36, using a vacuum or pressure pump as indicated in FIG. 1. An aperture cone 38 allows the light scattered from 40° to 70° to fall on a transfer lens 40 which focuses the flux onto a photodetector 42. A second aperture cone 48, transfer lens 50, and intensity detector 52 are oriented at right angles to the plane of polarization for detecting the intensity of the light scattered orthogonally to the polarization plane within an angle of about 80°–100°. Detectors 42 and 52 may be similar and may comprise a photodiode followed by an operational amplifier. The intensity output signals are fed along lines 56 and 54 to a readout instrument 60 comprising, for example, an oscilloscope, X-Y recorder, ratio-producing instrument, or the like.

The output of detector 42 is proportional to the intensity $I_{\parallel}$ where $$I_{\parallel} = \sum_{D} \left\{ N_a I_{\parallel\ a} + N_n I_{\parallel\ n} \right\}.$$

$N_a$ is the number of absorbing particles ($k>0$) of a diameter D, $N_n$ is the number of nonabsorbing particles ($k=0$), and $I_{\parallel\ a}$ and $I_{\parallel\ n}$ are the intensities of the rays scattered into the plane of polarization and integrated over the angular range from 40° to 70°, for the absorbing and nonabsorbing particles, respectively. The N and $I_{\|}$ terms are functions of the particle diameter and the sum extends over all particle sizes in the sample intercepted by the incident beam 33. Due to the inverse dependence of the $I_{\|}$ terms on the $k$ values of the particles, the total intensity $I_{\|}$ detected by detector 42 will be relatively large for an aerosol containing nonabsorbing particles and will be relatively small for an aerosol containing a large number of absorbing particles. Restated in the context of a smoke detector apparatus, $I_{\|}$ will be relatively large for an aerosol containing non-fire-produced particles and will be relatively small for an aerosol containing a large number of carbon-like particles.

The output of detector 52 is proportional to $I_{\perp}$ where $$I_{\perp} = \Sigma \left\{ N_a I_{\perp\ a} + N_n I_{\perp\ n} \right\}.$$

$N_a$ represents the number of absorbing particles of a diameter D, $N_n$ represents the number of nonabsorbing particles, and $I_{\perp\ a}$ $I_{\perp\ n}$ are the scattered intensities normal to the plane of polarization integrated over the angular range from 80° to 100°. $I_{\perp}$ is approximately portional to the total number of particles intercepted by incident beam 33, independent of whether they are absorbing or nonabsorbing, and is a quantity frequently used in prior art smoke detectors. Theoretical studies have shown that almost any 20° angular range can be effectively utilized for measuring $I_{\perp}$ to produce an intensity measurement proportional to the total particle density. The range centered at 90° is depicted in this preferred embodiment since $I_{\perp}$ is the quantity usually measured in prior art smoke detectors. In accordance with the present invention however, the quantity $I_{\perp}$ is utilized as a normalizing factor for the quantity $I_{\|}$ in order to take into account the total number of particles in the beam. Accordingly, the ratio of $I_{\|}$ to $I_{\perp}$ is an attractive instrumental output function which yields a chemical characterization of the aerosol sample by being proportional to the relative amounts of absorbing and nonabsorbing particles therein. Such a ratio could be generated by readout instrument 60 be feeding the intensity $I_{\|}$ thereto along line 56 and by feeding the intensity $I_{\perp}$ thereto along line 54. If the apparatus shown in FIG. 4 is utilized as a smoke detector, however, $I_{\|}$ would decrease for increases in the carbon content of the aerosol sample, and the ratio would approach a value of zero in an alarm condition. The opposite type of response, i.e. an increasing output for an alarm, is generally more convenient to use. Accordingly, the inverse ratio could be produced by appropriate electronics whereby an alarm would be sounded when the ratio approaches a threshold value indicative of a certain carbon content in the aerosol. Alternatively, readout instrument 60 may comprise an oscilloscope, an X-Y recorder, or the like, whose X-axis is connected via line 54 to detector 52, and whose Y-axis is connected via line 56 to detector 42. The slope of the resultant trace is small for absorbing (carbon-like) materials and large for nonabsorbing materials.

Figure 5:
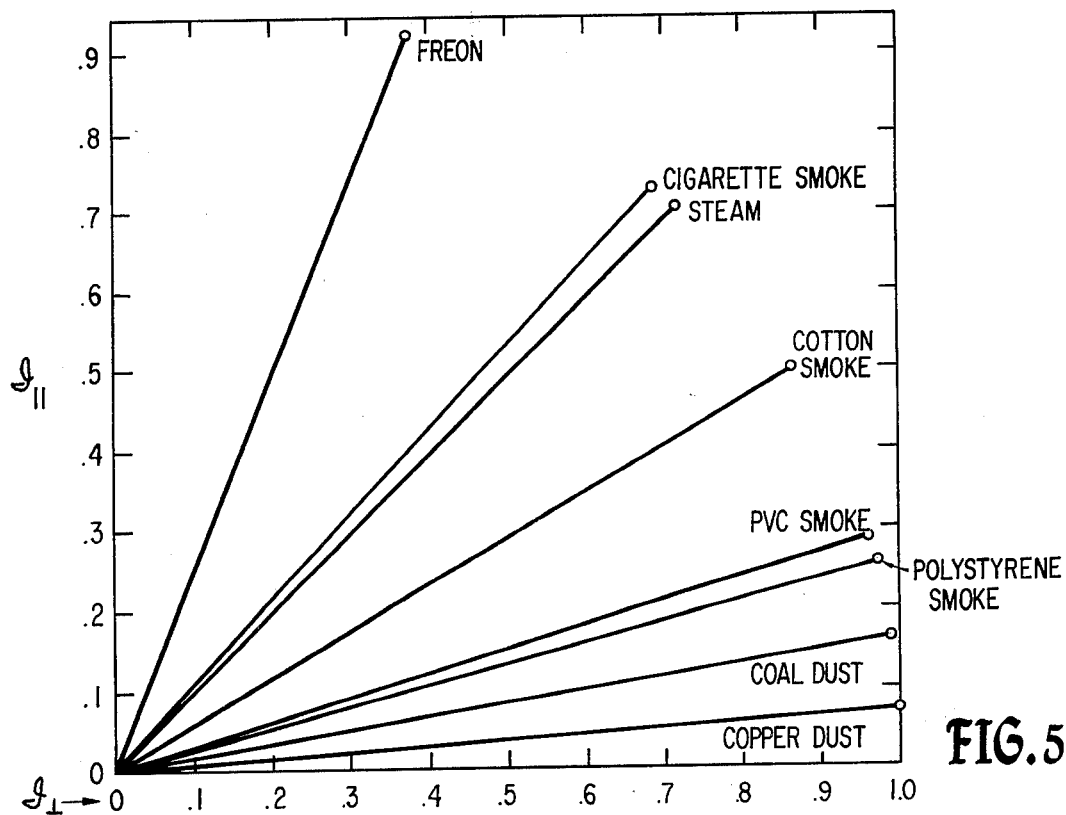
FIG. 5 is a graph illustrating the results obtainable from the preferred embodiment of the apparatus depicted in FIG. 4.

FIG. 5 shows the typical output of a smoke detector constructed according to the preferred embodiment of FIG. 4 in response to a number of different aerosol samples. Each line in the graph of FIG. 5 represents the output from, for example, an oscilloscope whose X-axis is connected to the detector 52 of FIG. 4 and whose Y-axis is connected to the detector 42. The length of the line for each sample is arbitrary and is actually a function of the total number of particles in the beam at any time. It is apparent from FIG. 5 that the present invention is extremely effective in distinguishing fire-produced aerosols from other types of absorbing and nonabsorbing aerosols. The region of the Freon curve is characteristic of a number of pressurized aerosols which use Freon as a dispersant. The curves representing cigarette smoke and steam are characteristic of two of the most common false alarm types of samples which were indistinguishable in prior art smoke detectors. The remaining samples depicted in FIG. 5 lie in a response region characteristic of aerosols which contain absorbing ($k>0$) material, and a careful measurement allows fire-produced aerosols to be distinguished from other absorbing materials.

It is seen from FIG. 3 that the instrument's response is only effective for particles larger than 0.3 $\mu$m and in fact, for particles smaller than 0.2 $\mu$m the response for absorbing materials is slightly larger than that for the nonabsorbing materials. If all the particles in the sample are larger than 0.3 $\mu$m, there is of course no problem and the smoke detector of FIG. 4 will respond to changes in the carbon content of the aerosol as previously described. However, if a vast majority of the particles in the sample are smaller than approximately 0.3 $\mu$m, the response may be insensitive to changes in the carbon content. In order to evaluate such a situation, the response of the instrument to changes in the particle size distribution can be studied utilizing the Junge universal distribution (see, e.g., *Air Chemistry and Radioactivity*, C.E. Junge, Academic Press, 1963, Pages 113–123):

$$N = AD^{-b}$$

which yields the number of particles N of diameter D as a function of two parameters A and $b$. Parameter A is related to the total particle density and is adjusted accordingly, while $b$ has been measured for a number of aerosols and is generally on the order of 4. The larger the $b$ value, the more strongly the distribution is shifted to favor the small particles. Theoretical analysis for a number of cases has shown that the smoke detector response, $I_{\|} /I_{\perp}$, is a valid measure of the carbon content of an aerosol provided that the particle size distribution has a $b$ value of 6 or less. The foregoing result is primarily due to the fact that for particles smaller than approximately 0.1 $\mu$m, the scattered intensity is proportional to the sixth power of the diameter and thus, these particles make a small contribution to the total scattered intensity. For a Junge distribution with $b=4$, over 98% of $I_{\|}$ or $I_{\perp}$ is due to particles with diameters between 0.1 and 2$\mu$m. Values of $b$ larger than 6 have not been reported in the literature, and accordingly such samples need not be considered within the context of the present invention. Since the response of the instrument of FIG. 5 was according to expectations, an independent analysis of the particle size distribution for those samples would likely indicate that they have $b$ values equal to or less than 6.

The invention thus provides a method and apparatus for chemically characterizing either single particles of matter or multi-particle aerosols. The instrument is useful in the fields of air pollution monitoring, smoke detection, and the like. Additional applications include the monitoring of the relative amount of coal dust in a coal mine atmosphere, or the relative amount of metallic dust in an industrial atmosphere. Additionally, dye-tagged particles could be monitored to study the effectiveness of various filtering and particulate removal systems.

Obviously, numerous modifications and variations of the present invention are possible in light of the above teachings. It is therefore to be understood that within the scope of the appended claims the invention may be practiced otherwise than as specifically described herein.

What is claimed is:

1. A method of determining the absorption coefficients of individual particles suspended in a fluid medium, comprising:
   impinging substantially plane-polarized light on an individual particle; and
   measuring the intensity of the light scattered by the particle into a divergent beam lying substantially in the plane of polarization of the impinging light and within an angular range from about 30° to about 90° with respect to the forward direction of the impinging light.

2. The method set forth in claim 1 and further including measuring the size of the individual particle.

3. The method set forth in claim 1, wherein said angular range extends from about 40° to about 70° with respect to the forward direction of said impinging light.

4. A method of determining the absorption coefficients of multiple particles suspended in a fluid medium, comprising:
   impinging substantially plane-polarized light on a stream of said particles;
   measuring the intensity of the light scattered by said particles into a first divergent beam lying substantially in the plane of polarization of the impinging light and within an angular range from about 30° to about 90° with respect to the forward direction of said impinging light; and
   measuring the intensity of the light scattered by said particles into a second divergent beam the intensity of which is related to the total number of particles.

5. The method set forth in claim 4 and further including determining the ratio of the intensity of said first divergent beam to the intensity of said second divergent beam.

6. Apparatus responsive to the absorption coefficients of particles suspended in a fluid medium, comprising:
   a light scattering cell;
   means for projecting a beam of substantially collimated plane-polarized light through said cell;
   means for flowing a stream of substantially widely spaced individual particles in said medium through said cell;
   first means for collecting the rays scattered from said particles substantially into the plane of polarization of the projected beam and within an angular range from about 30° to about 90° with respect to the forward direction of said projected beam; and
   first means for measuring the intensity of said rays collected by said first collecting means.

7. Apparatus as set forth in claim 6 and further including means for measuring the sizes of said individual particles.

8. Apparatus as set forth in claim 6, wherein said angular range extends from about 40° to about 70° with respect to the forward direction of said projected beam.

9. Apparatus as set forth in claim 6, wherein said flowing means is adapted to flow a stream of substantially closely spaced multiple particles through said cell; and
   second means for collecting the rays scattered from said particles into a beam the intensity of which is related to the total number of particles; and
   second means for measuring the intensity of said rays collected by said second collecting means.

10. Apparatus as set forth in claim 9 and further including means for determining the ratio of said first measured intensity to said second measured intensity.

* * * * *

UNITED STATES PATENT OFFICE
CERTIFICATE OF CORRECTION

Patent No. 3,901,602　　　　　　　　　Dated August 26, 1975

Inventor(s) Claude C. Gravatt, Jr.

It is certified that error appears in the above-identified patent and that said Letters Patent are hereby corrected as shown below:

Column 3, line 43, "3,612,689" should read --3,835,315--; column 5, line 18, the term "$\overset{\Sigma}{\Sigma}$" should read --D--; line 43, "be" (second occurrence) should read --by--.

Signed and Sealed this second Day of December 1975

[SEAL]

Attest:

RUTH C. MASON　　　　　　　　　C. MARSHALL DANN
*Attesting Officer*　　　　　　　　　*Commissioner of Patents and Trademarks*